(12) United States Patent
Rappoport et al.

(10) Patent No.: US 10,579,535 B2
(45) Date of Patent: Mar. 3, 2020

(54) DEFRAGMENTED AND EFFICIENT MICRO-OPERATION CACHE

(71) Applicant: Intel Corporation, Santa Clara, CA (US)

(72) Inventors: Lihu Rappoport, Haifa (IL); Jared Warner Stark, IV, Portland, OR (US); Franck Sala, Haifa (IL); Michael Tal, Yoqneam Illit (IL); Gil Shmueli, Haifa (IL); Adrian Flesler, Yokneam Illit (IL)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 15/843,292

(22) Filed: Dec. 15, 2017

(65) Prior Publication Data

US 2019/0188142 A1 Jun. 20, 2019

(51) Int. Cl.
*G06F 12/08* (2016.01)
*G06F 12/0891* (2016.01)
*G06F 12/0855* (2016.01)
*G06F 1/3246* (2019.01)
*G06F 9/30* (2018.01)
*G06F 12/126* (2016.01)

(52) U.S. Cl.
CPC ........ *G06F 12/0891* (2013.01); *G06F 1/3246* (2013.01); *G06F 9/3017* (2013.01); *G06F 9/30145* (2013.01); *G06F 12/0855* (2013.01); *G06F 12/126* (2013.01); *G06F 2212/1052* (2013.01); *G06F 2212/402* (2013.01)

(58) Field of Classification Search
CPC ............ G06F 12/0891; G06F 12/0855; G06F 12/126; G06F 9/30145; G06F 9/3017; G06F 1/3246; G06F 2212/402; G06F 2212/1052
See application file for complete search history.

(56) References Cited

U.S. PATENT DOCUMENTS

| 8,103,831 | B2 | 1/2012 | Rappoport et al. |
| 8,782,374 | B2 | 7/2014 | Rappoport et al. |
| 9,323,686 | B2 | 4/2016 | Mckeen et al. |
| 2003/0009620 | A1 | 1/2003 | Solomon et al. |
| 2003/0056066 | A1 | 3/2003 | Chaudhry et al. |
| 2004/0030835 | A1* | 2/2004 | van de Waerdt ... G06F 12/0864 711/128 |
| 2009/0249036 | A1 | 10/2009 | Rappoport et al. |
| 2010/0138610 | A1 | 6/2010 | Rappoport et al. |
| 2012/0215979 | A1* | 8/2012 | Hunt .................. G06F 12/0802 711/118 |
| 2013/0304991 | A1* | 11/2013 | Bottcher ............ G06F 12/0864 711/122 |

* cited by examiner

*Primary Examiner* — Hiep T Nguyen
(74) *Attorney, Agent, or Firm* — Lowenstein Sandler LLP

(57) ABSTRACT

A processor includes a processor core and a micro-op cache communicably coupled to the processor core. The micro-op cache includes a micro-op tag array, wherein tag array entries in the micro-op tag array are indexed according to set and way of set-associative cache, and a micro-op data array to store multiple micro-ops. The data array entries in the micro-op data array are indexed according to bank number of a plurality of cache banks and to a set within one cache bank of the plurality of cache banks.

20 Claims, 11 Drawing Sheets

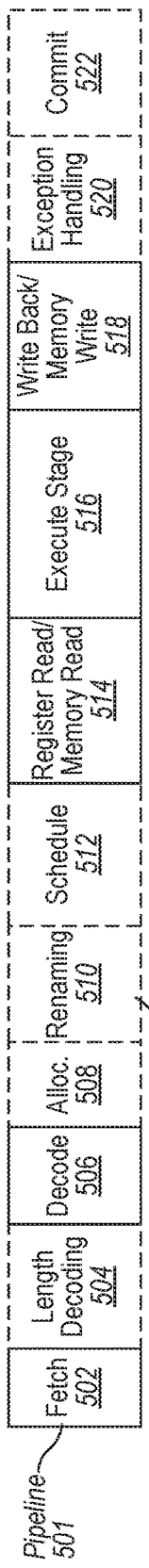
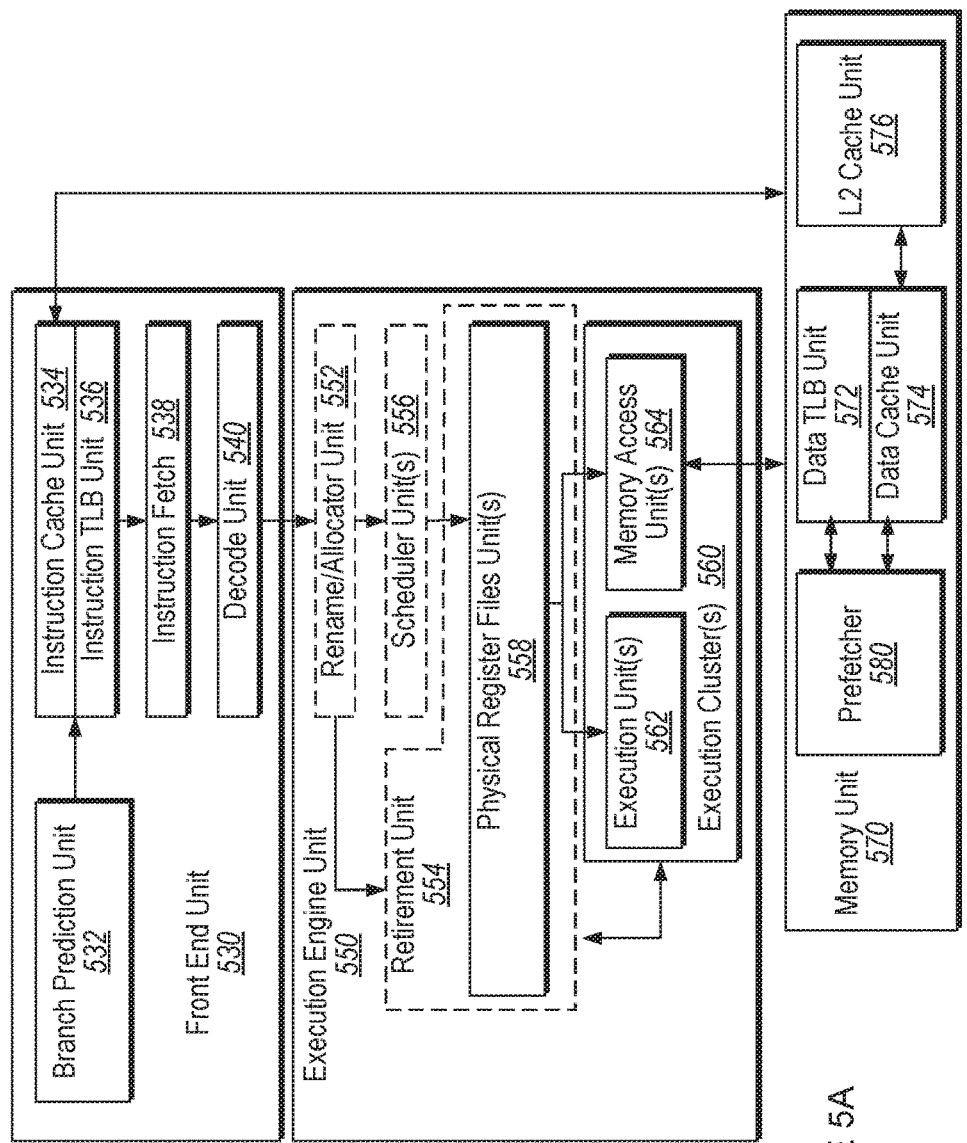
FIGURE 5B
FIGURE 5A

DEFRAGMENTED AND EFFICIENT MICRO-OPERATION CACHE

TECHNICAL FIELD

The disclosure relates to allocation of micro-operations to micro-operation cache, and more particularly, to a defragmented and efficient micro-operation cache.

BACKGROUND

Modern processors are designed with a micro-operation cache (e.g., μop or micro-op cache). As macro-instructions (e.g., line of computer program code that results in one or more lines of program code in a target assembly language) are executed, the processor translates the macro-instruction into micro-instructions also known as micro-operations (μops). If these μops are stored in cache located near to the machine hardware that is to execute the μops, then the μops may be more efficiently retrieved, particularly if some of the cached μops are repeatedly executed. The μops may be stored in the micro-op cache in a way that relates each set of μops to the main memory address for the macro-instruction from which the μop was translated. In this way, when a new macro-instruction to be executed contains an address matching a reference for that address in the micro-op cache, the processor may skip translation and directly fetch the μops for that macro-instruction that are already stored in the micro-op cache.

BRIEF DESCRIPTION OF THE DRAWINGS

FIG. 5A is a block diagram illustrating a micro-architecture for a processor that that implements hardware support for cache allocation to a micro-op cache, and in particular supports a defragmented and efficient micro-operation cache, according to one implementation.

FIG. 5B is a block diagram illustrating an in-order pipeline and a register renaming stage, out-of-order issue/execution pipeline implemented by processor of FIG. 5A that implements hardware support for cache allocation to a micro-op cache, and in particular supports a defragmented and efficient micro-operation cache.

DETAILED DESCRIPTION

Figure 1:
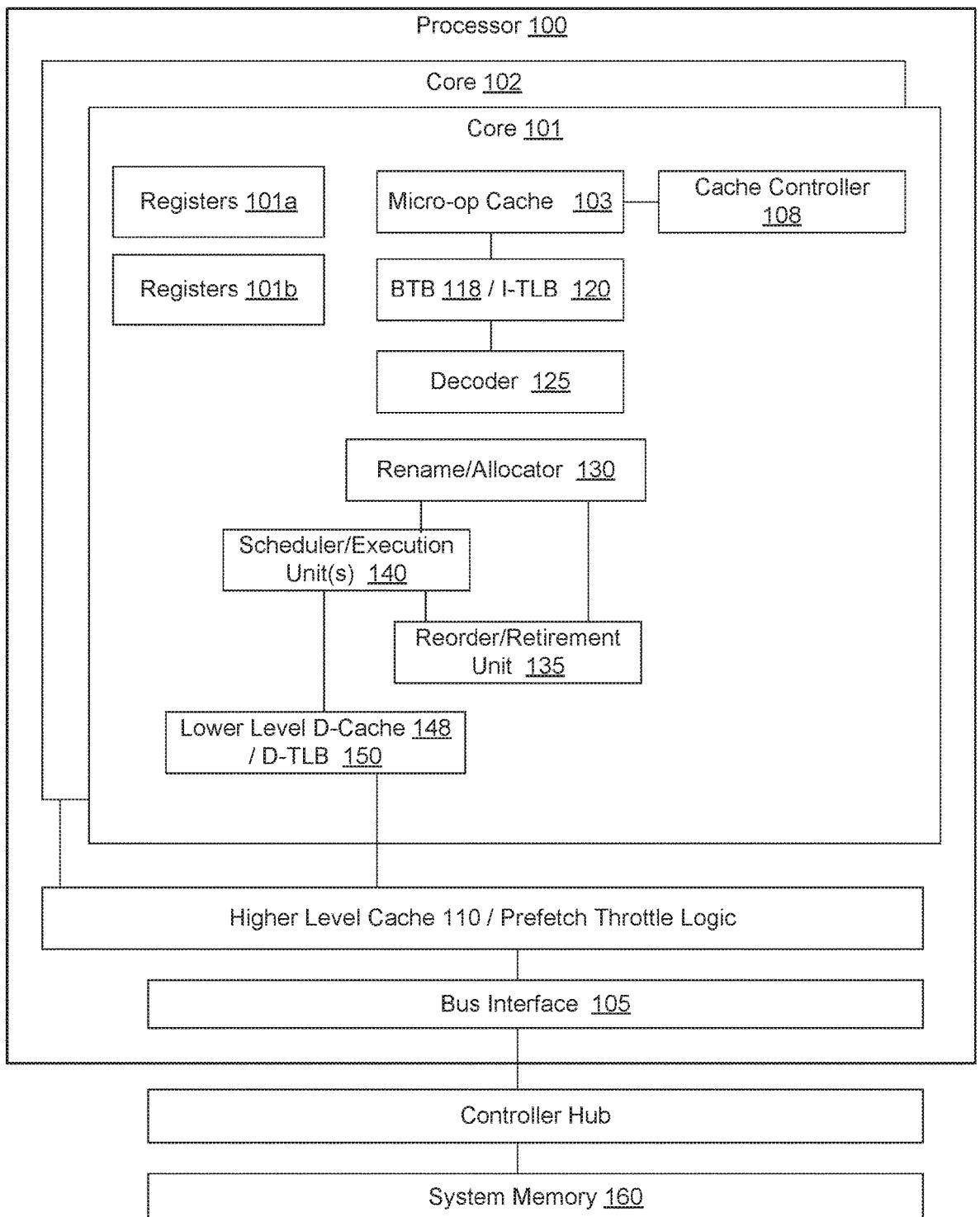
FIG. 1 is a block diagram of exemplary system architecture that implements allocation to multiple levels of cache, including a micro-op cache, according to implementations of the disclosure.

Implementations of the disclosure describe a system for defragmented and efficient micro-operation (micro-op or μop) cache. Within a computing system, to relate an address of a translated macro-instruction to a reference of a micro-op cache, cache controllers may allocate micro-operation (μop) entries within the micro-op cache to a plurality of sets of ways of a set-associative cache, which is also referred to as set-associative indexing. The "ways" are the slots or blocks into which the cache is equally divided. A set-associative cache for a typical data or instruction cache includes multiple cache ways organized within groups of cache sets, e.g., the indexing works by grouping the cache ways into sets, where each set corresponds to a set of main memory locations. Each cache way may include a metadata block that includes an address reference to actual data fetched from a main memory (e.g., a tag) and a data block (e.g., a cache line that contains data fetched from the main memory).

Using set-associative indexing principles within a micro-op cache, a micro-op cache may include a micro-op tag array to store the tag for a fetch address (from main memory) and a micro-op data array to store the corresponding micro-operations (μops), which are translated from one or more macro-instructions of code stored at the fetch address. For a cache entry, the tag in the tag array and the μops in the data array are stored within the same set and way allocation so that a cache controller is aware that once a tag match is found within the tag array, the cache controller can find the corresponding μops in the data array. Because μops are variable in number (e.g., each macro-instruction is translated into a variable number of μop(s) or a cache line of several macro-instructions translates into several uops), the cache controller may need to allocate not just one entry but multiple entries, each entry corresponding to a different way within the set-associative cache for the variable number of μops. In conventional systems implementing a micro-op cache, μops in a second of two (or a third of three) entries that are allocated to a second way (or a third way) of the micro-op cache leave one of the ways incompletely filled due to: i) way allocation filling each way from the start of the way, ii) a new entry starts with a new way allocation, iii) μops are not allowed to span across more than one entry, and iv) when a line of instructions contains a number of μops that is not a multiple of the number of μops that each way can contain. For example, with reference to the latter, assume the ways can contain up to six μops and a line of instruction contains seven μops. In that case, two ways may contain the seven μops: the first way will contain six μops and the second way will contains only one μops, so space for five μops will be wasted. This creates fragmentation and inefficient use of the micro-op cache in these conventional systems, where at any given time, up to 30% of the micro-op data array may be unused in a fully allocated state due to way fragmentation.

Such inefficient use of the micro-op cache in the conventional systems can result in additional expense in terms of chip area, timing (e.g., impacts bandwidth of number of μops), and power consumption. Because tags are relatively small in comparison to the μop data entries, the implications of the fragmentation are greater within the micro-op data array where larger chunks of memory within various ways are left unfilled, and thus are wasted.

In various implementations to make micro-op cache allocation more efficient, a processor may allocate multiple micro-ops to the micro-op data array using a different indexing structure than the conventional set-associative indexing used to allocate indexing metadata associated with the multiple micro-ops to the micro-op tag array. In one implementation, entries allocated to the micro-operation data array may be indexed according to bank number of a cache bank and to a set within the cache bank. A cache bank is a physical bank of multiple physical cache banks that makeup the micro-op cache. This allocation to the micro-op data array may be according to sequential bank numbers of multiple cache banks, and allocation may begin at any one of the multiple cache banks. In this implementation, a next sequential bank number after a last cache bank of the multiple cache banks may be a first bank number associated with a first cache bank of the multiple cache banks, thus creating a circular cache bank allocation across all the cache banks of the micro-op cache. In this way, as allocation sequentially progresses across cache banks of the micro-op data cache, the allocation also progresses across sets (or groups of sets) of the micro-op data cache, filling up the micro-op data cache without way allocation and its associated fragmentation.

The cache indexing within the micro-op cache according to implementations of the disclosure may allow the reduction in size of the micro-op data array by about 30% compared to the tag array, and provide cache allocation without fragmentation to the same micro-op bandwidth as previously obtained. Corresponding reduction in chip area, increase in bandwidth of micro-op allocation, and reduction in power consumption are thus achievable due to reductions in fragmentation. This cache indexing will also obviate the need for replicating read ports on the first banks of the micro-op cache due to pressure on cache bank allocation being more equally spread throughout all the banks, and nearly eliminating the chance of read conflicts in any given clock cycles Eliminating the need for additional read ports also further reduces the chip size of the micro-op cache compared to conventional high-bandwidth micro-op cache.

FIG. 1 is a block diagram of exemplary system architecture 100, according to implementations of the disclosure. A processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to hardware capable of being independently associated with code, such as a software thread, operating system, application, or other code. A physical processor typically refers to an integrated circuit, which potentially includes any number of other processing elements, such as cores or hardware threads.

A core may refer to logic located on an integrated circuit capable of maintaining an independent architectural state wherein each independently maintained architectural state is associated with at least some dedicated execution resources. In contrast to cores, a hardware thread may refer to logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The physical processor 100, as illustrated in FIG. 1, includes two cores, core 101 and 102. Here, core hopping may be utilized to alleviate thermal conditions on one part of a processor. Core hopping refers to switching thread execution between cores so as not to overtax one core compared to another core. Hopping from the core 101 to the core 102 may potentially create the same thermal conditions on the core 102 that existed on the core 101, while incurring the cost of a core hop. Therefore, in one embodiment, the processor 100 includes any number of cores that may utilize core hopping. Furthermore, power management hardware included in processor 100 may be capable of placing individual units and/or cores into low power states to save power. Here, in one embodiment, the processor 100 provides hardware to assist in low power state selection for these individual units and/or cores.

Although the processor 100 may include asymmetric cores, e.g., cores with different configurations, functional units, and/or logic, symmetric cores are illustrated. As a result, the core 102, which is illustrated as identical to the core 101, will not be discussed in detail to avoid repetitive discussion. In addition, the core 101 includes two hardware threads, while the core 102 may also include two hardware threads. Therefore, software entities, such as an operating system, potentially view the processor 100 as four separate processors, i.e. four logical processors or processing elements capable of executing four software threads concurrently.

In various implementations, a first thread is associated with a first set of architecture state registers 101a, a second thread is associated with a second set of architecture state registers 101b, a third thread is associated with a third set of architecture state registers (not illustrated), and a fourth thread is associated with a fourth set of architecture state registers (not illustrated). As illustrated, the architecture state registers 101a are replicated in the architecture state registers 101b, so individual architecture states/contexts are capable of being stored for a first logical processor and a second logical processor. Other smaller resources, such as instruction pointers and renaming logic in rename allocator logic 130 may also be replicated for the first thread and the second thread. Some resources, such as a re-order buffers in reorder/retirement unit 135, an instruction-translation buffer (I-TLB) 120, load/store buffers, and queues may be shared through partitioning. Other resources, such as general purpose internal registers, a page-table base register, a low level data-cache 148 and data-TLB 150, execution unit(s) 140, and portions of an out-of-order (or reorder) unit 135 are potentially fully shared.

The processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include other functional units, logic, or firmware not depicted. The processor 100 may include a branch target buffer (BTB) 118 to predict branches to be executed/taken and an I-TLB 120 to store address translation entries for instructions.

The processor 100 may further include a decode module, e.g., decoder 125, which may be coupled to a fetch unit, such as the BTB 118 or the I-TLB 120, to decode fetched instructions (i.e., macro-instructions). In this way, each macro-instruction may be translated by the decoder 125 into individual μops to be executed by machine hardware of the processor core 101. In various implementations, the micro-op cache 103 may be coupled to the BTB 118 and/or the I-TLB 120 in order to cache the μops close to the machine hardware. The processor core 101 may further include a cache controller 108 coupled to the micro-op cache 103 to manage allocation of writes to the micro-op cache 103 and reading from allocated entries to the micro-op cache 103.

Note that the core 101 may include multiple decoders where some decoders translate simple instructions and at least one decoder is adapted to decode complex instructions, which each instruction is variable in length and generates one or more μop(s), which are also variable in length. In one implementation, the processor 100 is associated with an Instruction Set Architecture (ISA) that defines/specifies instructions executable on the processor 100. Here, machine code instructions (μops) recognized by the ISA may include a portion of the instruction referred to as an opcode, which references/specifies an instruction or operation to be performed.

In one example, the allocator (or renamer) 130 includes an allocator to reserve resources, such as register files, to store instruction processing results. The first thread or the second thread is potentially capable of out-of-order execution, where the allocator and renamer 130 may also reserve other resources, such as reorder buffers to track instruction results. The allocator 130 may also include a register renamer to rename program/instruction reference registers to other registers internal to the processor 100. The reorder/retirement unit 135 may include components, such as the reorder buffers mentioned above, load buffers, and store buffers, to support out-of-order execution and later in-order retirement of instructions executed out-of-order.

Scheduler and execution unit(s) 140, in one embodiment, may include a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

The lower level data cache 148 and data translation buffer (D-TLB) 150 may be coupled to the execution unit(s) 140. The data cache 148 (e.g., L1, L2 cache) may store recently used/operated on elements, such as data operands, which are potentially held in memory coherency states. The D-TLB 150 may store recent virtual/linear to physical address translations. As a specific example, a processor may include a page table structure to break physical memory into multiple virtual pages.

The processor 100 may also include a bus interface module 105 to communicate with devices external to the processor 100, such as a system memory 160, a chipset, a northbridge, or other integrated circuit. The memory 160 may be dedicated to the processor 100 or shared with other devices in a system. Common examples of types of memory 175 may include dynamic random access memory (DRAM), static RAM (SRAM), non-volatile memory (NV memory), and other such storage devices.

As depicted, the cores 101 and 102 share access to higher-level (or further-out) cache 110, which may cache recently fetched elements from the memory 160. Note that higher-level or further-out refers to cache levels increasing or getting farther way from the execution unit(s) 140. In one embodiment, higher-level cache 110 is a last-level data cache (LLC)—last cache in the memory hierarchy on processor 100—such as a second or third level data cache. Higher level cache 110 is not so limited, as the higher level cache 110 may be associated with or may include an instruction cache. A trace cache—a type of instruction cache—instead may be coupled after the decoder 125 to store recently decoded traces. In one implementation, the micro-op cache 103 is a type of trace cache. The micro-op cache 103 may cache decoded μops so that the μops can be quickly retrieved if to be executed again. In this way, the micro-op cache avoids the need to re-decode macro-instructions directed to the same address for which a reference is already stored in the micro-op cache 103, and without concern about branches in execution flow of code.

As discuss above, in the micro-op cache of conventional systems, the micro-op data array has been implemented with the same set-way indexing structure as the micro-op tag array, thus the data array would incur the same fragmentation issues as the tag array. As discussed, these fragmentation issues arise from the variable number of μops that map to each fetch line and that multiple μops are not allowed to span across cache entries, jumps, or other similar branch-related operations. Because set-associative cache fills up each way from the beginning and starts at a new way for a new entry of multiple μops, many cache ways are only partially filled and have more pressure applied on the first and second cache banks of the micro-op data array. In order to reach high micro-op supply bandwidth, these previous solutions replicate read ports on the first and second (and perhaps third and fourth) cache banks to handle read conflicts on those cache banks due to simultaneous reads while keeping multi-way cache allocation (and fetching) to a single cycle. The addition of a read port in a bank is hardware costly, increases the size of the micro-op cache bank by up to 40%, and cannot be added after manufacturing. In another example, instead of replicating the read ports, these cache banks may be split into even and odd entries and allow reading two entries from the cache banks when the entries belong to a different split bank. Splitting banks also has a cost in area and timing, complicates the design, and doesn't always work as the two uops that are read from such a cache bank may both belong either to an even address or an odd address. The disclosed cache architecture and structure of implementations of the disclosure described herein avoids the replication of read ports, the over-pressure of certain cache banks, and eliminates fragmentation of the micro-op data array.

Figure 2:
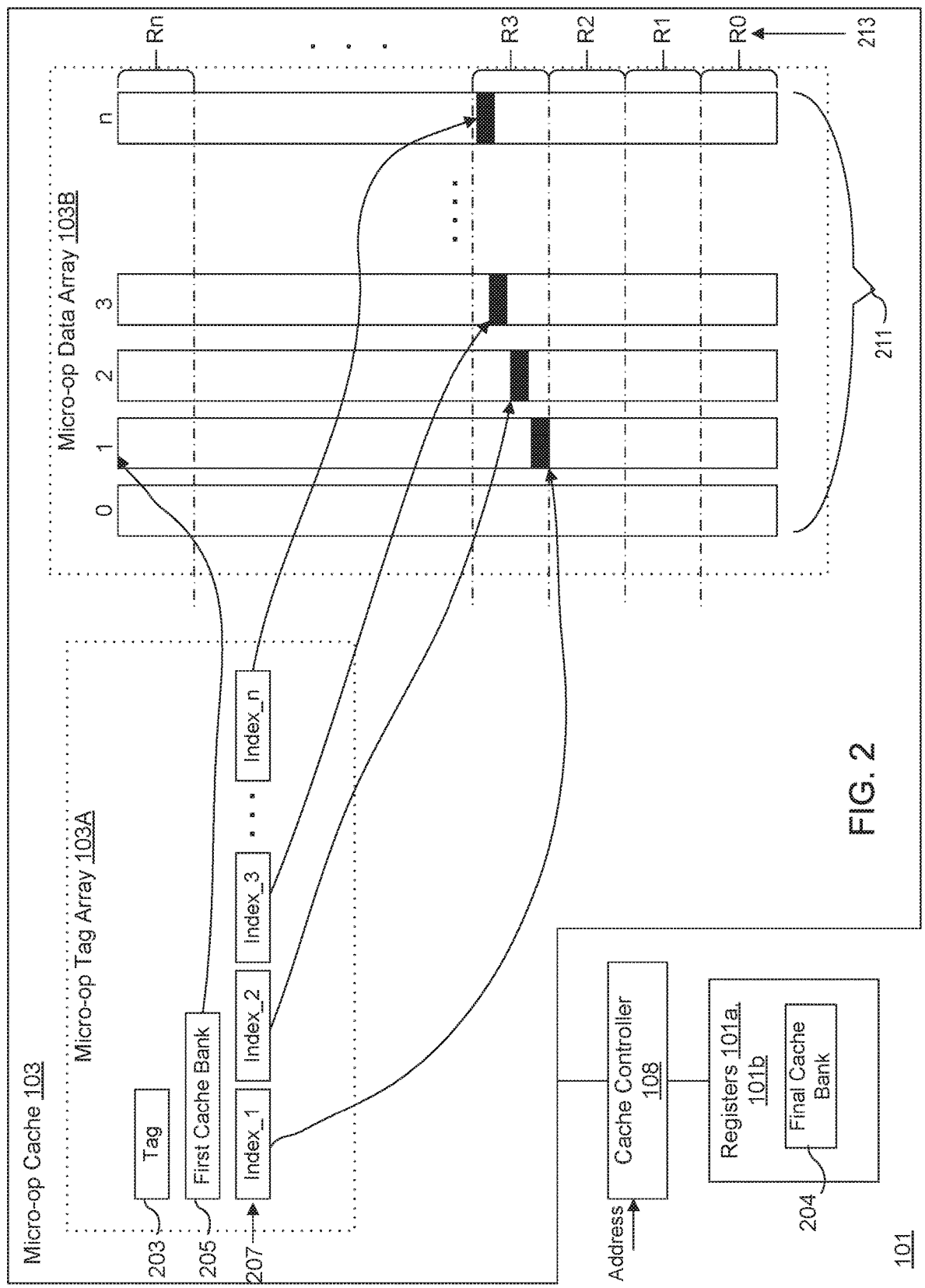
FIG. 2 is block diagram of a micro-op tag array and an associated micro-op data array of the micro-op cache of FIG. 1, according to implementations of the disclosure.

FIG. 2 is block diagram of a core 101 including a micro-op tag array 103A and an associated micro-op data array 103B of the micro-op cache 103 of FIG. 1, according to implementations of the disclosure. The micro-op tag array 103A may store, for each entry in the micro-op cache 103, a tag 203 (e.g., [31:9] or other upper address range of a 32-bit address, for example), a first bank indicator 205, and multiple index pointers 207, one index pointer for each micro-op (μop). Each index pointer 207 may point to a location in a cache bank of the micro-op data array 103B, e.g., to a bank number of the cache bank and to a set within the numbered cache bank. In various implementations, the micro-op data array 103B may be made up of multiple cache banks 211, numbered at the top (as illustrated) as 0, 1, 2, 3 . . . n. Each cache bank 211 may be further partitioned into multiple regions 213, numbered as, for example, R0, R1, R2 . . . Rn, each region spanning multiple, consecutively-numbered sets. The first bank indicator 205 and the multiple index pointers 207 may be associated with the tag 203, e.g., stored in connection with the tag 203 in the micro-op tag array. In one implementation, the tag 203, the first bank indicator 205, and the multiple index pointers 207 may be stored with other entries in the micro-op cache 103 according to the set-way structure of set-associative cache.

In various implementations, when the cache controller 108 receives a current fetch address (or simply "address"), the cache controller 108 may match the tag (or upper address bits) of the address to, for example, the tag 203 stored in the micro-op tag array 103A. If there is a match, the data associated with the address is present in the micro-op cache 103 and may be read out by the cache controller 108. If there is no match of the incoming tag with a tag within the micro-op tag array 103A, the cache controller 108 may allocate at least one new entry to the micro-op cache 103 in which to store tag and indexing metadata (in the micro-op tag array 103A) and to store μops translated from one or more macro-instruction(s) retrieved from a higher level of instruction cache (in the micro-op data array 103B). Allocation of the new entry may include designating the first bank indicator 205 (in the micro-op data array 103B), or the first cache bank where the entry allocation begins, and the multiple index pointers 207, e.g., one index pointer for each μop of the translated macro-instruction that is to be written in the at least one new entry.

In some implementations, the cache controller 108 may store identification of the final cache bank of an allocated entry as a value in a register 204 of the first set of architecture state registers 101a or the second set of architecture state registers 101b. In another implementation, the register 204 may be located elsewhere within the processor core 101. The value associated with the final cache bank stored in the register 204 may identify the bank number of the final cache bank to which a final micro-op of the entry was stored. Accordingly, in view of the next tag miss at the micro-op cache 103, the cache controller 108 may retrieve this value (of the final cache bank number) from the register 204 and populate the first bank indicator 205 with this value plus one, to allocate to a next cache bank that sequentially follows the final cache bank for a subsequent entry.

In a further implementation, the register 204 may also store a value of a final cache bank for a final μop of a most-recent-hit entry in the micro-op data array 103B after a period of micro-op cache hits (e.g., there has been no recent need for a new allocation within the micro-op cache 103 due to several sequential hits in the micro-op cache). Note that to "hit" means that a tag match has been found within the micro-op tag array 103A. In this implementation, further allocation within the micro-op cache may be performed with an entry that starts with a next cache bank that sequentially follows the final cache bank identified by the value stored in the register.

In one implementation, the allocation of the entry to the micro-op data array 103B may begin with allocation to the first cache bank identified within the first bank indicator 205. In at least some cache entry allocations, this initial allocation may be to a cache bank other than the first cache bank(s) of the multiple cache banks 211, which takes pressure off the first cache bank(s). The allocation may then continue sequentially across the cache banks 211 of the micro-op data array 103B, e.g., in increasing values of the bank number. Accordingly, each index pointer of the multiple index pointers 207 may be generated by incrementing the (first) bank number sequentially for each μop of a cache entry. In another implementation the bank number is sequentially decremented across the multiple cache banks 211. The set (or row) within the cache bank for each μop (e.g., each index pointer) may also be established according to which set within that cache bank has a free slot, and optionally, is close to a previously-indexed set. In this way, μops for each of multiple μops are sequentially allocated across cache banks, which takes pressure off any given cache bank and reduces conflicts to near zero. A conflict may still arise due to a potential anomaly where a macro-instruction is repeatedly executed in close succession, which may happen so infrequently that an extra cycle may be used if a read conflict ever occurs at a cache bank.

In one implementation, the set may be allocated to one of multiple sets associated with a region 213 of the cache bank. As illustrated, the μops of the current entry in the micro-op data array 103B have been allocated to region three (R3) of cache banks one through n. In this way, the number of bits needed for each index pointer of the multiple index pointers 207 is smaller and may provide for a compression within the micro-op tag array 103A by using less cache memory for the index pointers (e.g., each index pointer may go from an 8-bit number to a 4-bit number or similar reduction).

Assuming the cache controller 108 finds a match in the micro-op tag array 103A for the current fetch address (e.g., a match with tag 203), the cache controller may retrieve the μops of the corresponding cache entry by reading the μops from the micro-op data array 103B to which the multiple index pointers 207 point, starting with the first cache bank identified within the first bank indicator 205. As illustrated, the cache controller 108 retrieves the μop stored at the indexed location of Index_1 within Bank 1 (here Bank_1 is the first bank, which can be any bank of the n banks), followed by the μop stored at the indexed location of Index_2 within Bank 2, and so forth through the μop stored at the indexed location of the Index_n within Bank n. Each retrieved μop may then be executed by machine hardware of the processor core 101.

Figure 3:
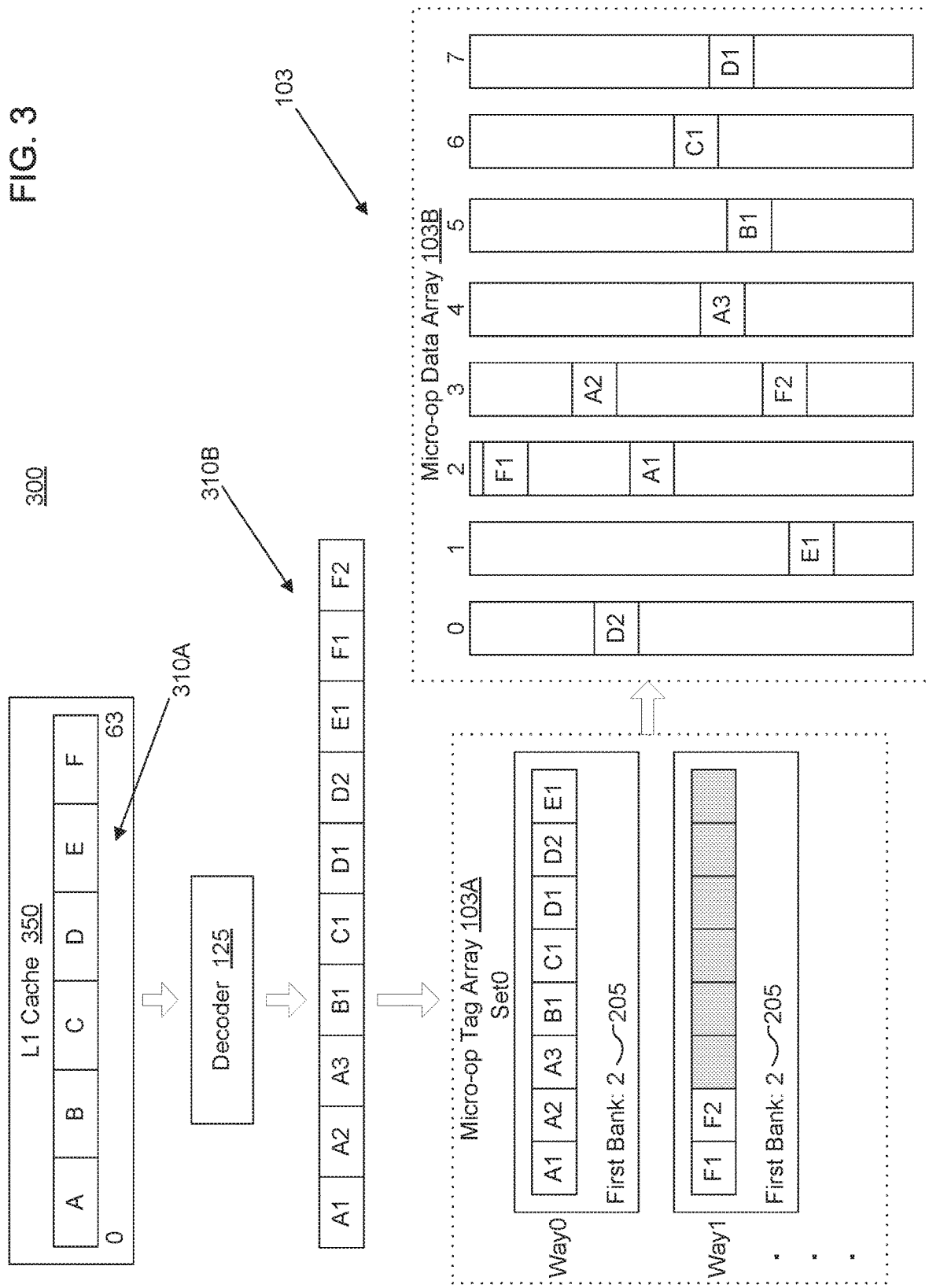
FIG. 3 is a block diagram of instruction translation and data flow into the micro-op cache depicted in FIGS. 1 and 2, according to implementations of the disclosure.

FIG. 3 is a block diagram of a system 300 for instruction translation and data flow into the micro-op cache 103 depicted in FIGS. 1 and 2, according to implementations of the disclosure. Note that in the example implementation of FIG. 3, a 64-byte line of code 310A may be stored in a higher level cache than the micro-op cache 103, e.g., in this case in an L1 cache 350. This 64-byte line of code 310A may include a number of macro-instructions, including instructions A through F for exemplary purposes. The decoder 125 (FIG. 1) may translate the 64-byte line of code 310A into a series of micro-operations 310B. In the illustrated implementation, instruction A is translated into μops A1, A2, and A3, instruction B is translated into μop B1, instruction C is translated into μop C1, instruction D is translated into μops D1 and D2, instruction E is translated into μop E1, and instruction F is translated into μops F1 and F2.

The cache controller 108 may then perform a tag matching operation as previously discussed. For this example, assume there was no tag match within the micro-op tag array 103A, and at least one entry will be allocated into the micro-op cache 103 related to a current fetch address. Note that because there are 10 μops to store in the micro-op cache 103 and each way gets filled with 8 μops, two entries that use two ways are required within the micro-op tag array 103A. As illustrated, Way_0 is filled with index pointers for μops A1 through E1 (a first entry), but index pointers for μops F1 and F2 are allocated to Way_1 in the micro-op tag array 103A (a second entry), leaving the remaining portion of Way_1 unfilled and thus fragmented. As previously discussed, a certain level of fragmentation is acceptable in the micro-op tag array 103A because tags take up less space, and so the fragmentation is less.

In one implementation, the entry in the micro-op data array 103B may be allocated according to bank number and set within the bank number. As the first bank indicator 205 indicates, allocation begins with the cache bank numbered two, so μop A1 is stored in a set in bank 2. Allocation continues with the cache controller 108 allocating μops according to sequential bank numbers from cache bank 2 to cache bank 7, and back again to cache banks 0 through 3. Note that while the μop allocation performed in the micro-op data array 103B is somewhat spread across sets of each cache bank, the allocation may be confined to sets within an identified region of the multiple regions 213, as discussed with reference to FIG. 2, to provide better compression in the micro-op tag array 103A and faster access speeds within the micro-op data array 103B.

By virtue of the sequential allocation across cache banks that starts with a different cache bank than the first cache bank, the conflicts that would have occurred on cache banks 0 and 1 did not occur and the consequence of adding extra read ports to cache banks 0 and 1 has been avoided. Furthermore, there may be little to no fragmentation as, through this distributed allocation, holes within the micro-op data array 103B are filled and entire rows (or columns) of cache are not left partially filled.

Figure 4:
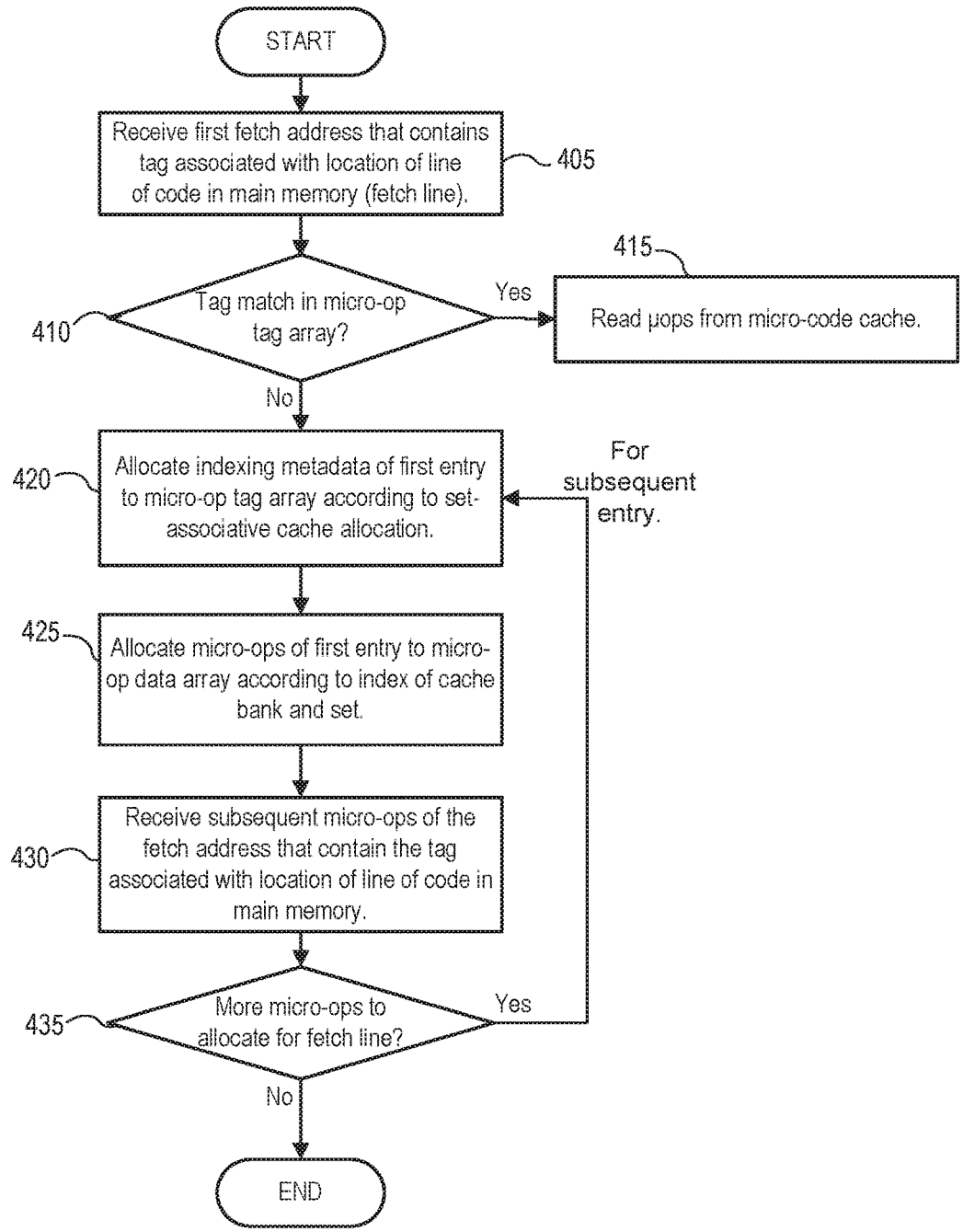
FIG. 4 is a flow chart of a method of allocating entries within the micro-op cache depicted in FIGS. 1-3, according to implementations of the disclosure.

FIG. 4 is a flow chart of a method 400 of allocating entries within the micro-op cache depicted in FIGS. 1-3, according to implementations of the disclosure. The method 400 may be performed by processing logic that may include hardware (e.g., circuitry, dedicated logic, programmable logic, microcode, etc.), software (such as instructions run on a processing system, a general purpose computer system, or a dedicated machine), firmware, or a combination thereof. In one embodiment, the method 400 may be performed, in part, by processing logics of any one of processing cores 101, 102 executing an operating system with respect to FIG. 1. In particular, the method 400 may be performed by the cache controller 108 in conjunction with the micro-op cache 103.

With reference to FIG. 4, the method 400 may begin with the processing logic receiving a first fetch address that contains a tag associated with a location of a line of code in main memory (e.g., fetch line) (405). The method 400 may continue with the processing logic determining whether a tag within the first fetch address matches a tag stored in the micro-op tag array (410). If the tag matches, the method 400 may continue with the processing logic reading μops for associated with the first fetch address from the micro-code cache (415). The method 400 may continue with the processing logic allocating indexing metadata of the first entry to the micro-op tag array according to set-associative cache allocation, which may mean allocation of two entries crossing two separate ways as illustrated in FIG. 3 (420). FIG. 3 is only an example, as the processing logic may need to allocate more than two ways in order to cache all the μops that come from a given fetch line. The indexing metadata may include a first bank indicator and a plurality of index pointers, where each index pointer is associated with a μop of multiple μops of a translated line of code for the first fetch address. If there are too many index pointers to fit within a single entry of a single way of set-associative cache, the processing logic may allocate at least a second entry to another way, and so forth, limited by the associativity (e.g., the number of ways) of the micro-op tag array.

The method 400 may continue with the processing logic allocating μops of the first entry to the micro-op data array according to an index of a cache bank (chosen from a plurality of cache banks) and set within the cache bank (chosen from a group of sets) (425). In one implementation, allocation of the μops starts at the cache bank indicated by the first bank indicator, which cache bank may not be the first cache bank of the multiple cache banks of the micro-op data array. Furthermore, the allocation of μops at block 425 to the micro-op data array may be according to sequential bank numbers of the cache banks of the micro-op data array. Additionally, the allocation of the μop at block 425 may also optionally be to sets within an identified region (e.g., the identical region) of the cache banks, where each region covers multiple consecutively-numbered sets.

With continued reference to FIG. 4, the method 400 may continue with the processing logic receiving subsequent μops of the fetch address that contain the tag associated with the location of the line of code in the main memory (e.g., the fetch line) (430). The method may continue with the processing logic determining whether there are additional μops from the fetch line to allocate to the micro-op cache (435). If there are additional μops for allocation, the method 400 may continue with the processing logic looping back to blocks 420 and 425 to continue allocation of the subsequent μops in at least a second entry in the micro-op cache. If there are no more μops from the fetch line, than the method 400 may end, but may be repeated for a second fetch address associated with a second location of a second line of code in the main memory (e.g., a second fetch line).

FIG. 5A is a block diagram illustrating a micro-architecture for a processor 500 that implements hardware support for cache allocation to a micro-op cache, and in particular supports a defragmented and efficient micro-operation cache, according to an implementation. Specifically, processor 500 depicts an in-order architecture core and a register renaming logic, out-of-order issue/execution logic to be included in a processor according to at least one implementation of the disclosure. In one implementation, process 500 is the same as processor 100 described with respect to FIG. 1.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one implementation, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different scheduler circuits, including reservations stations (RS), central instruction window, etc. The scheduler unit(s) 556 is coupled to the physical register set(s) unit(s) 558. Each of the physical register set(s) units 558 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 558 is overlapped by the retirement unit 554 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register set(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 556, physical register set(s) unit(s) 558, and execution cluster(s) 560 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some implementations DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary implementation, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one implementation, the data prefetcher 580 speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A that implements hardware support for cache allocation to a micro-op cache, and in particular supports a defragmented and efficient micro-operation cache. The solid lined boxes in FIG. 5B illustrate an in-order pipeline 501, while the dashed lined boxes illustrate a register renaming, out-of-order issue/execution pipeline 503. In FIG. 5B, the pipelines 501 and 503 include a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some implementations, the ordering of stages 502-524 may be different than illustrated and are not limited to the specific ordering shown in FIG. 5B.

Figure 6:
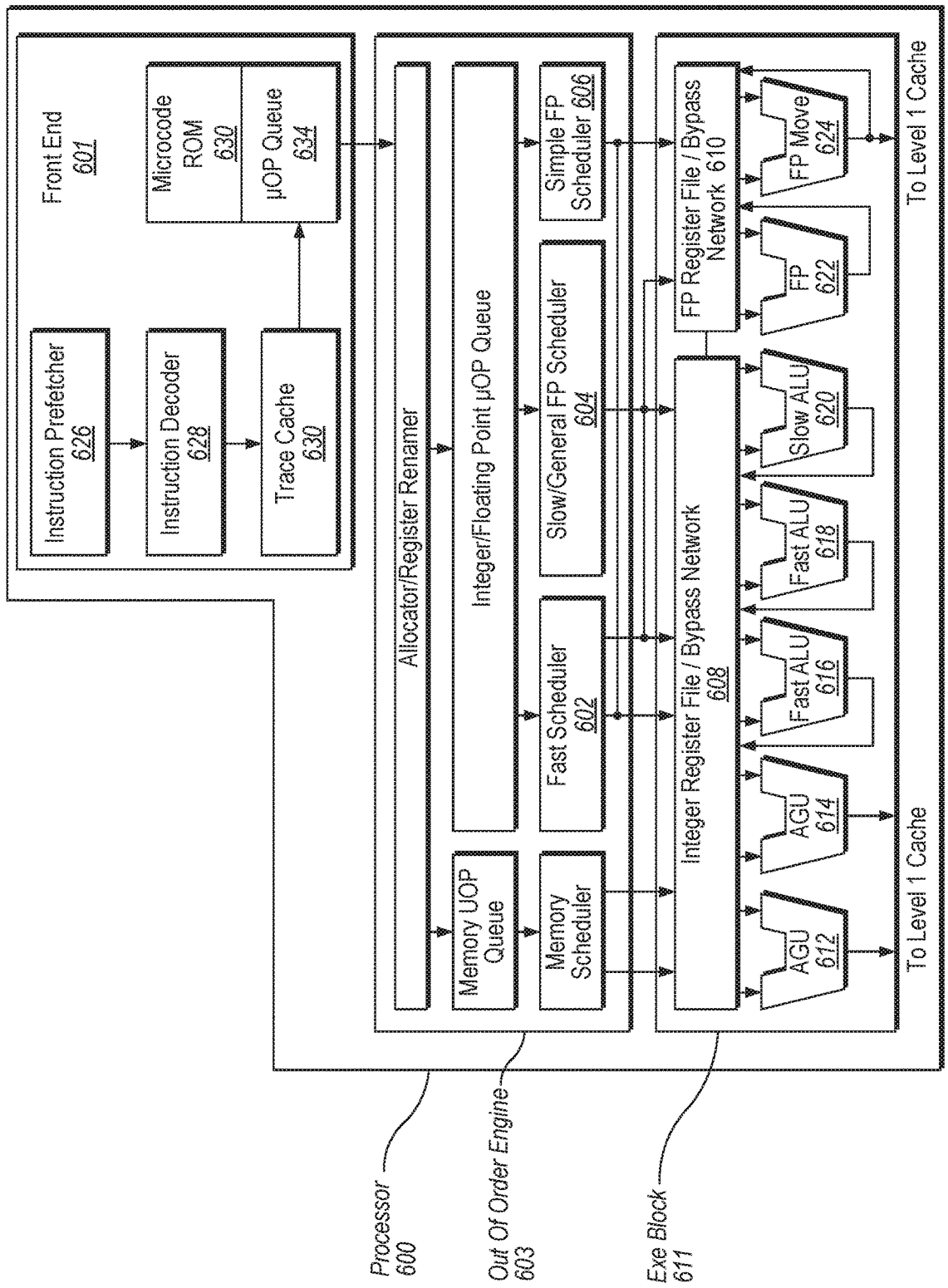
FIG. 6 illustrates a block diagram of the micro-architecture for a processor or an integrated circuit implements hardware support for cache allocation to a micro-op cache, and in particular supports a defragmented and efficient micro-operation cache, according to an implementation of the disclosure.

FIG. 6 illustrates a block diagram of the micro-architecture for a processor 600 that includes logic circuits of a processor or an integrated circuit that implements hardware support for cache allocation to a micro-op cache, and in particular supports a defragmented and efficient micro-operation cache, according to an implementation. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 601 is the part of the processor 600 that fetches instructions to be executed and prepares them to be used later in the processor pipeline. The implementations of the page additions and content copying can be implemented in processor 600.

The front end 601 may include several units. In one implementation, the instruction prefetcher 616 fetches instructions from memory and feeds them to an instruction decoder 618 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 630 takes decoded uops and assembles them into program ordered sequences or traces in the uop queue 634 for execution. When the trace cache 630 encounters a complex instruction, microcode ROM (or RAM) 632 provides the uops needed to complete the operation.

Some instructions are converted into a single micro-op, whereas others need several micro-ops to complete the full operation. In one implementation, if more than four micro-ops are needed to complete an instruction, the decoder 618 accesses the microcode ROM 632 to do the instruction. For one implementation, an instruction can be decoded into a small number of micro ops for processing at the instruction decoder 618. In another implementation, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one implementation from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one implementation can schedule on each half of the main clock cycle while the other schedulers can only schedule once per main processor clock cycle. The schedulers arbitrate for the dispatch ports to schedule uops for execution.

Register sets 608, 610, sit between the schedulers 602, 604, 606, and the execution units 612, 614, 616, 618, 620, 622, 624 in the execution block 611. There is a separate register set 608, 610, for integer and floating point operations, respectively. Each register set 608, 610, of one implementation also includes a bypass network that can bypass or forward just completed results that have not yet been written into the register set to new dependent uops. The integer register set 608 and the floating point register set 610 are also capable of communicating data with the other. For one implementation, the integer register set 608 is split into two separate register sets, one register set for the low order 32 bits of data and a second register set for the high order 32 bits of data. The floating point register set 610 of one implementation has 128 bit wide entries because floating point instructions typically have operands from 64 to 128 bits in width.

The execution block 611 contains the execution units 612, 614, 616, 618, 620, 622, 624, where the instructions are actually executed. This section includes the register sets 608, 610, that store the integer and floating point data operand values that the micro-instructions need to execute. The processor 600 of one implementation is comprised of a number of execution units: address generation unit (AGU) 612, AGU 614, fast ALU 616, fast ALU 618, slow ALU 620, floating point ALU 612, floating point move unit 614. For one implementation, the floating point execution blocks 612, 614, execute floating point, MMX, SIMD, and SSE, or other operations. The floating point ALU 612 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 616, 618. The fast ALUs 616, 618, of one implementation can execute fast operations with an effective latency of half a clock cycle. For one implementation, most complex integer operations go to the slow ALU 620 as the slow ALU 620 includes integer execution hardware for long latency type of operations, such as a multiplier, shifts, flag logic, and branch processing. Memory load/store operations are executed by the AGUs 622, 624. For one implementation, the integer ALUs 616, 618, 620, are described in the context of performing integer operations on 64 bit data operands. In alternative implementations, the ALUs 616, 618, 620, can be implemented to support a variety of data bits including 16, 32, 128, 256, etc. Similarly, the floating point units 622, 624, can be implemented to support a range of operands having bits of various widths. For one implementation, the floating point units 622, 624, can operate on 128 bits wide packed data operands in conjunction with SIMD and multimedia instructions.

In one implementation, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 7:
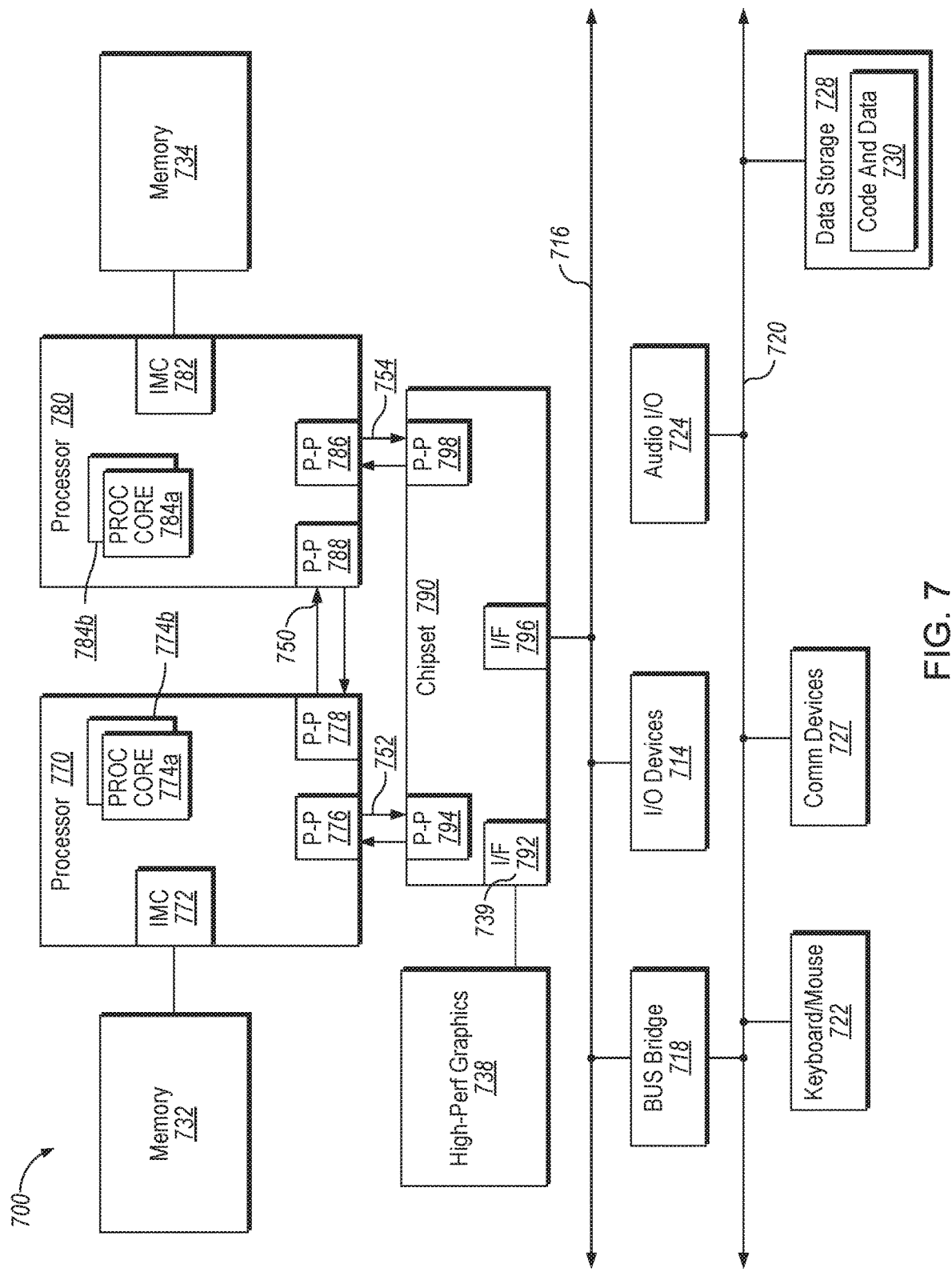
FIG. 7 is a block diagram of a computer system that implements hardware support for cache allocation to a micro-op cache, and in particular supports a defragmented and efficient micro-operation cache, according to one implementation.

Implementations may be embodied in many different system types. Referring now to FIG. 7, shown is a block diagram of a multiprocessor system 700 that implements hardware support for cache allocation to a micro-op cache, and in particular supports a defragmented and efficient micro-operation cache, in accordance with an implementation. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774*a* and 774*b* and processor cores 784*a* and 784*b*), although potentially many more cores may be present in the processors. While shown with two processors 770, 780, it is to be understood that the scope of the disclosure is not so limited. In other implementations, one or more additional processors may be present in a given processor.

Processors 770 and 780 are shown including integrated memory controller units 772 and 782, respectively. Processor 770 also includes as part of its bus controller units point-to-point (P-P) interfaces 776 and 788; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

Chipset 790 may be coupled to a first bus 716 via an interface 796. In one implementation, first bus 716 may be a Peripheral Component Interconnect (PCI) bus, or a bus such as a PCI Express bus or interconnect bus, although the scope of the disclosure is not so limited.

Figure 8:
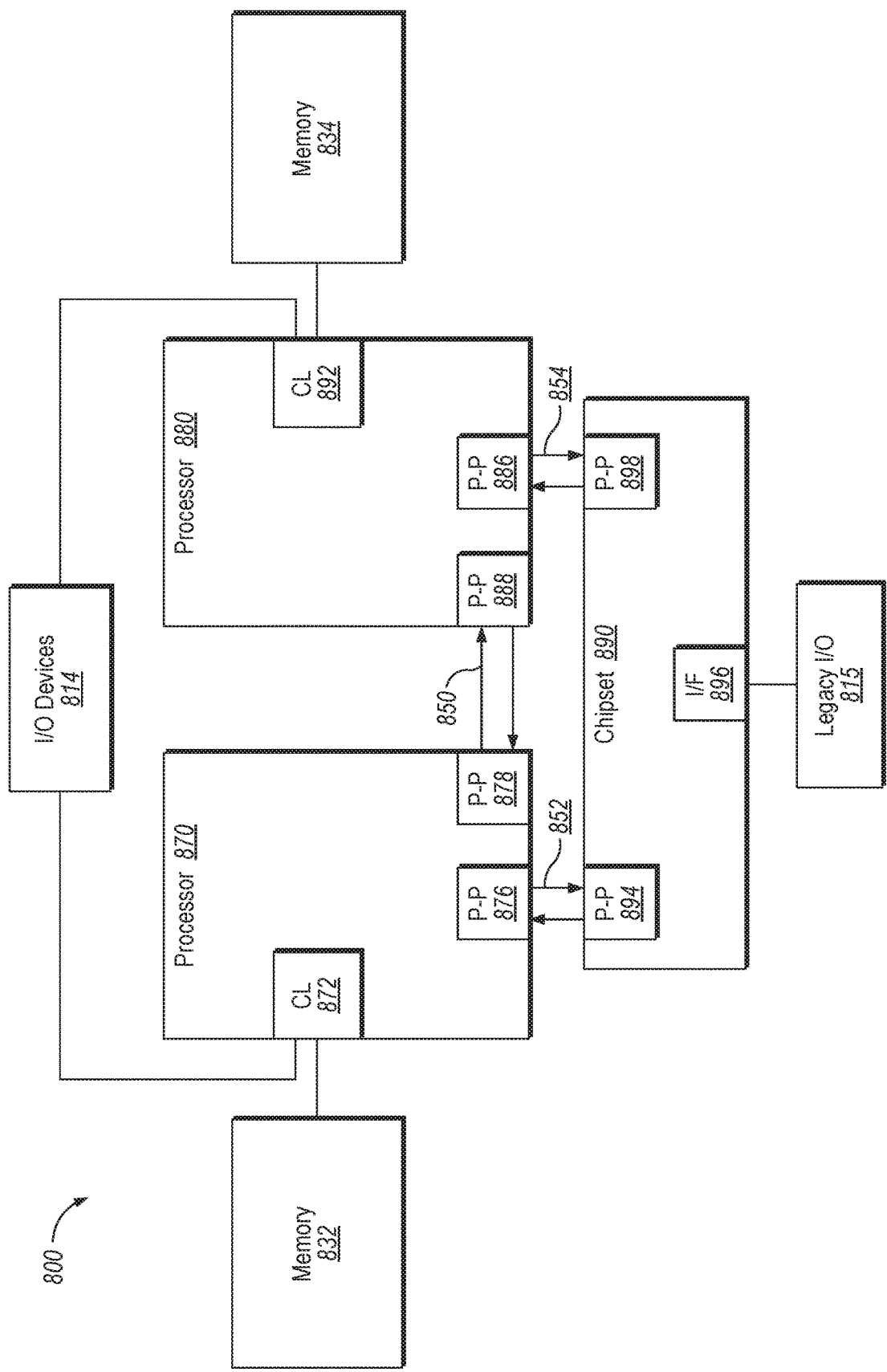
FIG. 8 is a block diagram of a computer system that implements hardware support for cache allocation to a micro-op cache, and in particular supports a defragmented and efficient micro-operation cache, according to another implementation.

Referring now to FIG. 8, shown is a block diagram of a third system 800 that implements hardware support for cache allocation to a micro-op cache, and in particular supports a defragmented and efficient micro-operation cache, in accordance with an implementation of the disclosure. Like elements in FIGS. 7 and 8 bear like reference numerals and certain aspects of FIG. 8 have been omitted from FIG. 7 in order to avoid obscuring other aspects of FIG. 8.

FIG. 8 illustrates that the processors 870, 880 may include integrated memory and I/O control logic ("CL") 872 and 892, respectively. For at least one implementation, the CL 872, 882 may include integrated memory controller units such as described herein. In addition. CL 872, 892 may also include I/O control logic. FIG. 8 illustrates that the memories 832, 834 are coupled to the CL 872, 892, and that I/O devices 814 are also coupled to the control logic 872, 892. Legacy I/O devices 815 are coupled to the chipset 890.

Figure 9:
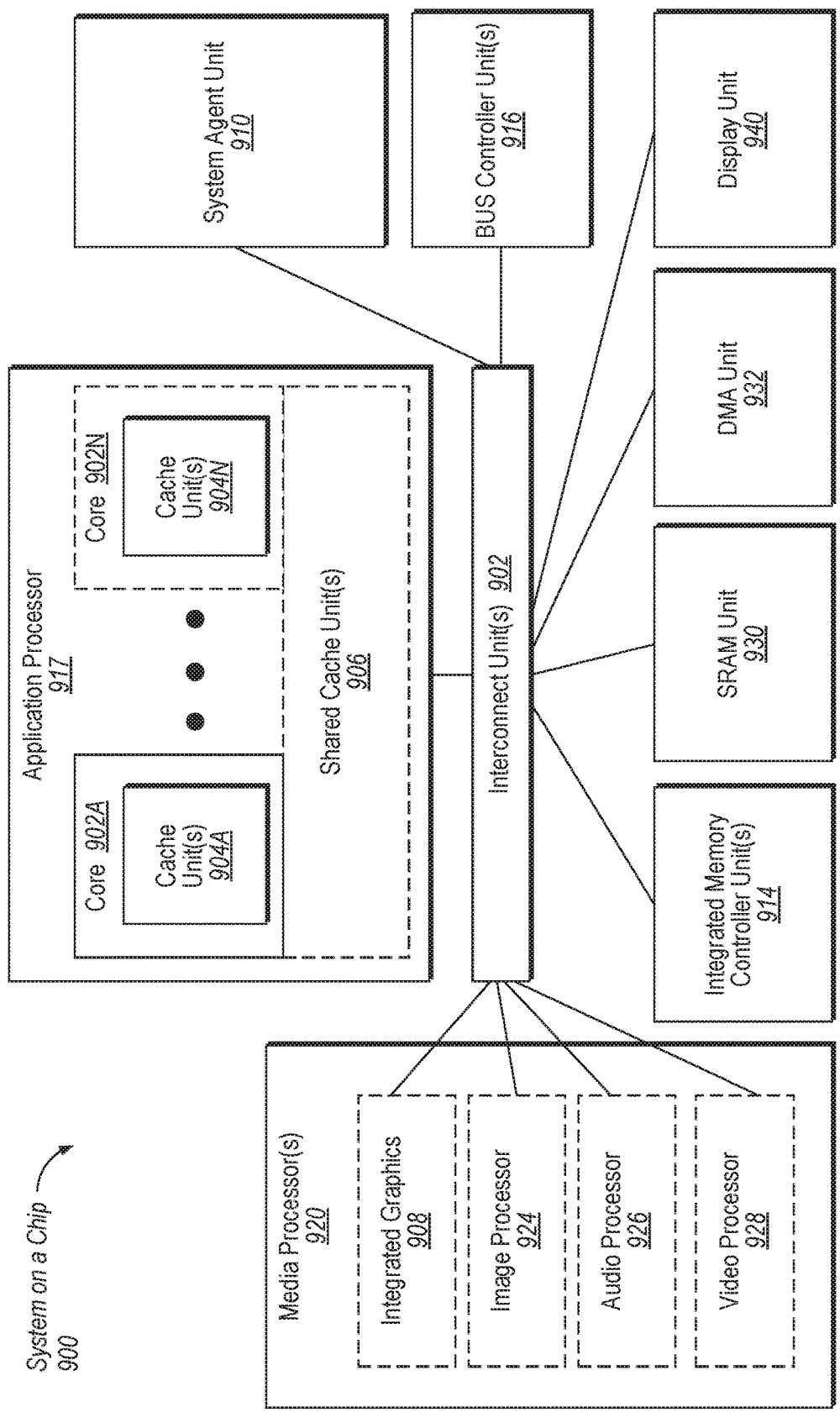
FIG. 9 is a block diagram of a system-on-a-chip that implements hardware support for cache allocation to a micro-op cache, and in particular supports a defragmented and efficient micro-operation cache, according to one implementation.

FIG. 9 is an exemplary system on a chip (SoC) 900 that implements hardware support for cache allocation to a micro-op cache, and in particular supports a defragmented and efficient micro-operation cache, according to one implementation. The SoC 900 may include one or more of the cores 902A . . . 902N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 900 of FIG. 9, dashed lined boxes are features on more advanced SoCs. An interconnect unit(s) 902 may be coupled to: an application processor 917 which includes a set of one or more cores 902A-N and shared cache unit(s) 906; a system agent unit 910; a bus controller unit(s) 916; an integrated memory controller unit(s) 914; a set of one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
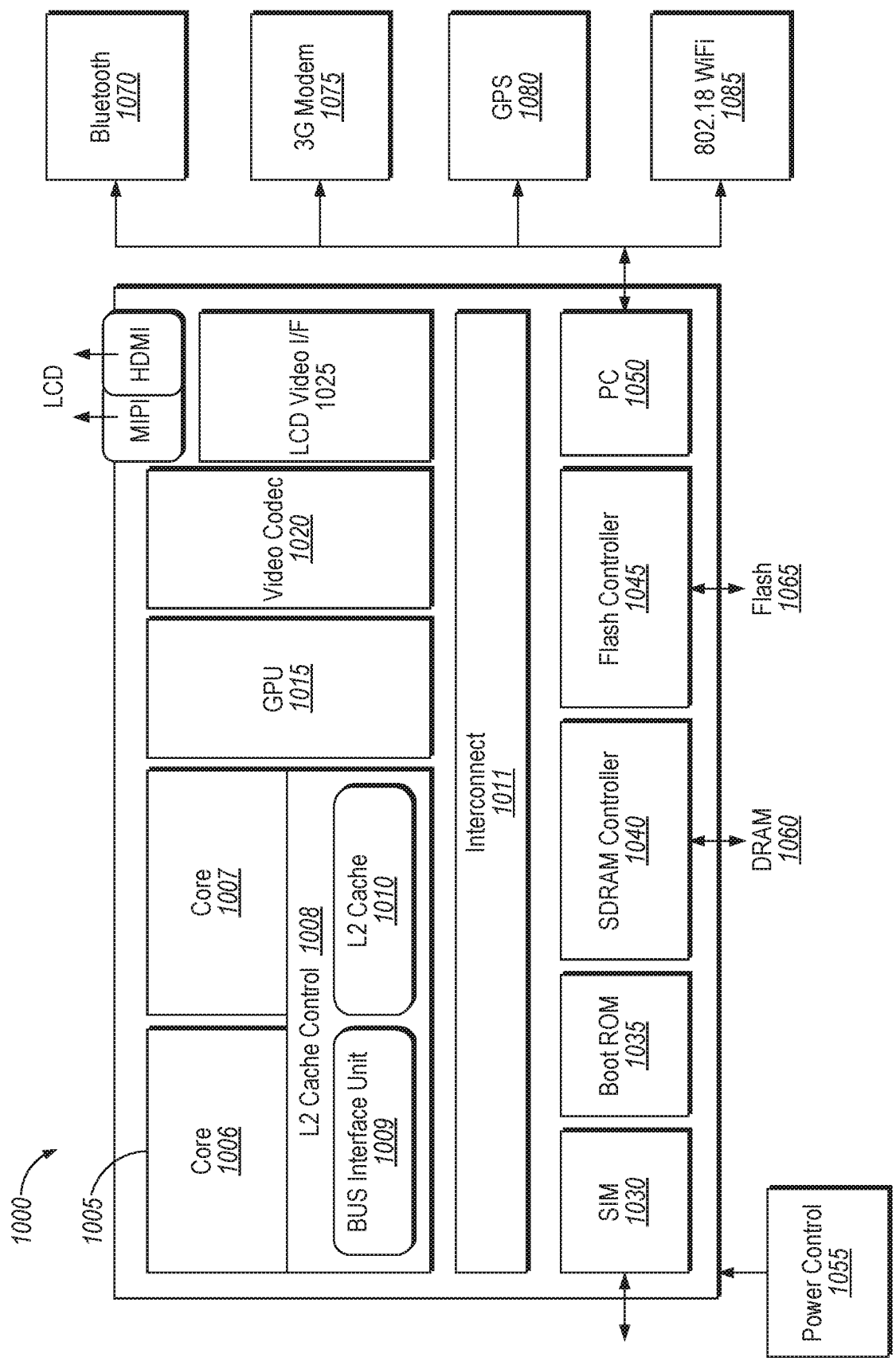
FIG. 10 illustrates a block diagram for a computing system that implements hardware support for cache allocation to a micro-op cache, and in particular supports a defragmented and efficient micro-operation cache, according to one implementation.

Turning next to FIG. 10, an implementation of a system on-chip (SoC) design that implements hardware support for cache allocation to a micro-op cache, and in particular supports a defragmented and efficient micro-operation cache, in accordance with implementations of the disclosure. As an illustrative example, SoC 1000 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1000.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure.

In one implementation, SDRAM controller 1040 may connect to interconnect 1011 via cache 1010. Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the implementations described herein.

In addition, the system illustrates peripherals for communication, such as a Bluetooth® module 1070, 3G modem 1075, GPS 1080, and Wi-Fi® 1085. Note as stated above, a UE includes a radio for communication. As a result, these peripheral communication modules may not all be included. However, in a UE some form of a radio for external communication should be included.

Figure 11:
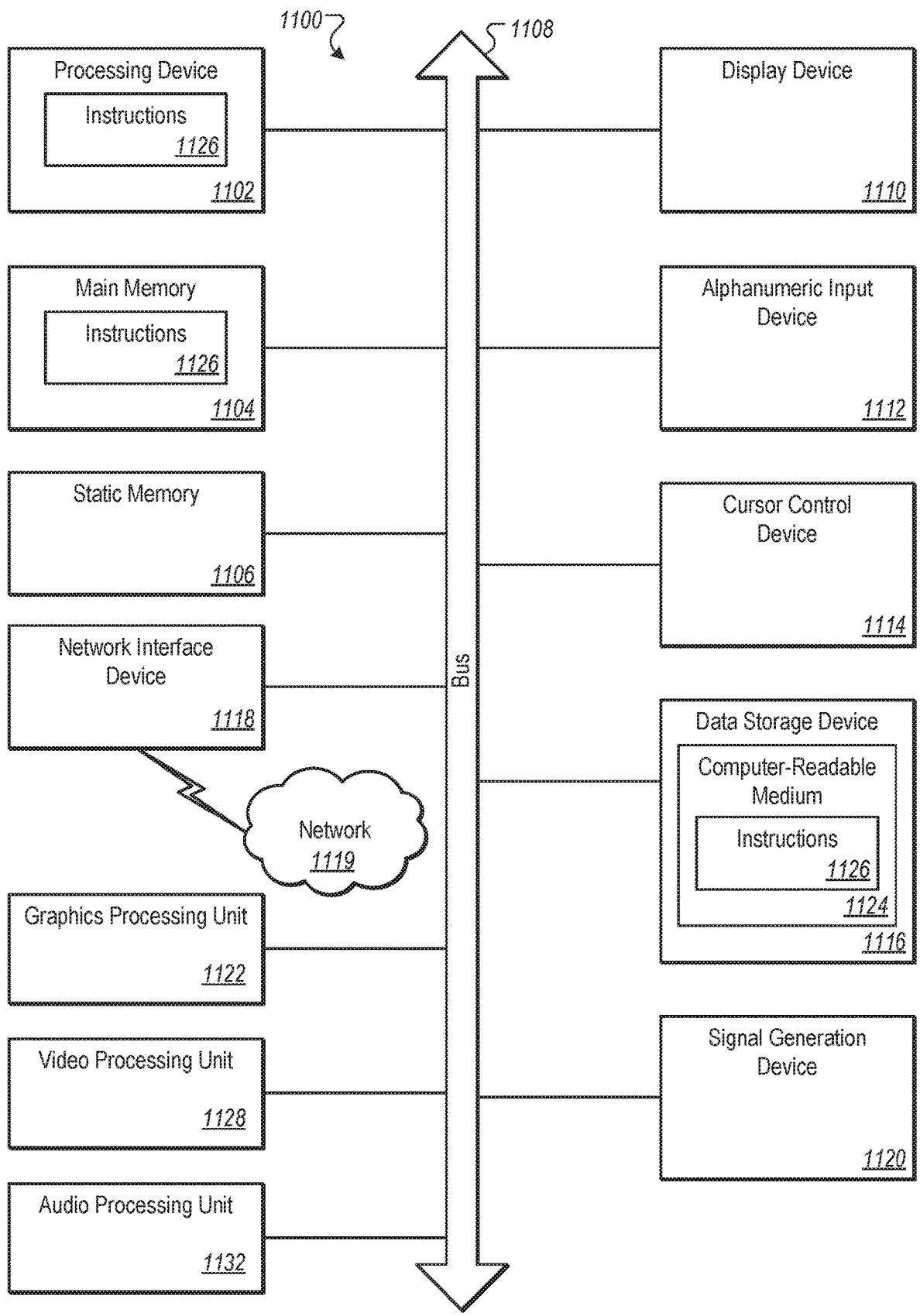
FIG. 11 illustrates a block diagram for a computing system that implements hardware support for cache allocation to a micro-op cache, and in particular supports a defragmented and efficient micro-operation cache, according to another implementation.

FIG. 11 illustrates a diagrammatic representation of a machine in the example form of a computing system 1100 within which a set of instructions, for causing the machine to perform any one or more of the methodologies discussed herein, may be executed. The one or more methodologies may include those that implement hardware support for cache allocation to a micro-op cache, and in particular supports a defragmented and efficient micro-operation cache. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1100.

The computing system 1100 includes a processing device 1102, main memory 1104 (e.g., flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1116, which communicate with each other via a bus 1108.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application-specific integrated circuit (ASIC), a field programmable gate array (FPGA), a digital signal processor (DSP), network processor, or the like. In one implementation, processing device 1102 may include one or more processor cores. The processing device 1102 is configured to execute the processing logic 1126 for performing the operations discussed herein.

In one implementation, processing device 1102 can be part of a processor or an integrated circuit that includes the disclosed LLC caching architecture. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1118 communicably coupled to a network 1119. The computing system 1100 also may include a video display device 1110 (e.g., a liquid crystal display (LCD) or a cathode ray tube (CRT)), an alphanumeric input device 1112 (e.g., a keyboard), a cursor control device 1114 (e.g., a mouse), a signal generation device 1120 (e.g., a speaker), or other peripheral devices. Furthermore, computing system 1100 may include a graphics processing unit 1122, a video processing unit 1128 and an audio processing unit 1132. In another implementation, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1116 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102, and/or a software library containing methods that call the above applications. While the computer-readable storage medium 1124 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is a processor comprising: 1) a processor core; and 2) a micro-op cache communicably coupled to the processor core, the micro-op cache comprising: 3) a micro-op tag array, wherein tag array entries in the micro-op tag array are indexed according to set and way of set-associative cache; and 4) a micro-op data array to store multiple micro-ops, wherein data array entries in the micro-op data array are indexed according to bank number of a plurality of cache banks and to a set within one cache bank of the plurality of cache banks.

In Example 2, the processor of Example 1, wherein allocation to the micro-op data array is according to sequential bank numbers of the plurality of cache banks, and wherein a next sequential bank number after a last cache bank of the plurality of cache banks comprises a first bank number associated with a first cache bank of the plurality of cache banks.

In Example 3, the processor of Example 2, further comprising a cache controller coupled to the micro-op cache, the cache controller to: a) store, in a register of the processor core, identification of a final cache bank of the plurality of cache banks to which a final micro-op of a first entry was allocated in the micro-op data array; and b) allocate, to a next cache bank that sequentially follows the final cache bank of the plurality of cache banks, a first micro-op of a second entry to the micro-op data array, wherein allocation of the second entry sequentially follows allocation of the first entry.

In Example 4, the processor of Example 2, wherein allocation to the micro-op data array is to begin allocation to a cache bank of the plurality of cache banks other than a first cache bank of the plurality of cache banks in at least some cache entry allocations.

In Example 5, the processor of Example 1, wherein the micro-op tag array comprises a plurality of index pointers, each index pointer of the plurality of index pointers to point to a bank number and set within a cache bank of the plurality of cache banks of the micro-op data array.

In Example 6, the processor of Example 5, wherein each cache bank of the plurality of cache banks of the micro-op data array is partitioned into a plurality of regions, each region spanning multiple consecutively-numbered sets, and wherein each index pointer of the plurality of index pointers is to point to a set within an identified region of the plurality of regions.

In Example 7, the processor of Example 1, wherein the micro-op data array is sized to be at least thirty percent smaller than the micro-op tag array.

Various implementations may have different combinations of the structural features described above. For instance, all optional features of the processors and methods described above may also be implemented with respect to a system described herein and specifics in the examples may be used anywhere in one or more implementations.

Example 8 is an integrated circuit comprising: 1) a micro-op cache comprising a micro-op tag array and a micro-op data array; and 2) a cache controller coupled to the micro-op cache, wherein to allocate a first entry to the micro-op cache, the cache controller is to: a) allocate indexing metadata of the first entry to the micro-op tag array according to a plurality of sets of ways of set-associative cache; and b) allocate a plurality of micro-ops to the micro-op data array according to an index within the micro-op data array, the index comprising bank number of a plurality of cache banks and a set within one cache bank of the plurality of cache banks of the micro-op data array.

In Example 9, the integrated circuit of Example 8, wherein to allocate the plurality of micro-ops to the micro-op data array, the cache controller is to sequentially allocate each micro-op of the plurality of micro-ops across the plurality of cache banks according to a sequential bank number, and wherein the sequential bank number after a last cache bank of the plurality of cache banks comprises a first bank number of a first cache bank of the plurality of cache banks.

In Example 10, the integrated circuit of Example 9, wherein, upon further allocation to the micro-op cache after a period of micro-op cache hits, the cache controller is further to: a) store, in a register, identification of a final cache bank of the plurality of cache banks associated with a final micro-op of a most-recent-hit entry in the micro-op data array; and b) allocate, to a next cache bank that sequentially follows the final cache bank of the plurality of cache banks, a first micro-op of a second entry to the micro-op data array, wherein allocation of the second entry sequentially follows the final cache bank identified in the register.

In Example 11, the integrated circuit of Example 8, wherein, to allocate the plurality of micro-ops to the micro-op data array, the cache controller is to begin allocation to a cache bank of the plurality of cache banks other than a first cache bank of the plurality of cache banks.

In Example 12, the integrated circuit of Example 8, wherein the micro-op tag array comprises a plurality of index pointers, each index pointer of the plurality of index pointers to point to a bank number and set within a cache bank of the plurality of cache banks of the micro-op data array.

In Example 13, the integrated circuit of Example 12, wherein each cache bank of the plurality of cache banks of the micro-op data array is partitioned into to a plurality of regions, each region spanning multiple consecutively-numbered sets, and wherein each index pointer of the plurality of index pointers is to point to a set within an identified region of the plurality of regions.

In Example 14, the integrated circuit of Example 8, wherein the micro-op data array is sized to be at least thirty percent smaller than the micro-op tag array.

Various implementations may have different combinations of the structural features described above. For instance, all optional features of the processors and methods described above may also be implemented with respect to a system described herein and specifics in the examples may be used anywhere in one or more implementations Example 15 is a method comprising: 1) allocating, by a cache controller of a processor, indexing metadata of a first entry to a micro-op tag array of a micro-op cache according to a plurality of sets of ways of set-associative cache; and 2) allocating, by the cache controller, a plurality of micro-ops of the first entry to a micro-op data array of the micro-op cache, wherein allocating the plurality of micro-ops is according to an index comprising bank number of a plurality of cache banks and a set within one cache bank of the plurality of cache banks of the micro-op data array.

In Example 16, the method of Example 15, wherein allocating the plurality of micro-ops to the micro-op data array comprises sequentially allocating each micro-op of the plurality of micro-ops across the plurality of cache banks according to a sequential bank number, wherein the sequential bank number after a last cache bank of the plurality of cache banks comprises a first bank number of a first cache bank of the plurality of cache banks.

In Example 17, the method of Example 16, further comprising: a) storing, in a register, identification of a final cache bank of the plurality of cache banks of the micro-op data array to which a final micro-op of the first entry was allocated; and b) allocating, to a next cache bank that sequentially follows the final cache bank of the plurality of cache banks, a first micro-op of a second entry to the micro-op data array, wherein allocating the second entry sequentially follows allocating the first entry.

In Example 18, the method of Example 15, wherein allocating the plurality of micro-ops to the micro-op data array comprises beginning allocation to a cache bank of the plurality of cache banks other than a first cache bank of the plurality of cache banks.

In Example 19, the method of Example 15, wherein allocating the indexing metadata to the micro-op tag array comprises storing an index pointer for each of a plurality of micro-ops, the index pointer to point to a bank number and set within a cache bank of the plurality of cache banks of the micro-op data array.

In Example 20, the method of Example 19, further comprising: a) partitioning each cache bank of the plurality of cache banks into a plurality of regions, each region spanning multiple consecutively-numbered sets; and b) configuring each index pointer to point to a set within an identified region of the plurality of regions.

Various implementations may have different combinations of the structural features described above. For instance, all optional features of the processors and methods described above may also be implemented with respect to a system described herein and specifics in the examples may be used anywhere in one or more implementations.

Example 21 is an apparatus comprising: 1) means for allocating indexing metadata of a first entry to a micro-op tag array of a micro-op cache according to a plurality of sets of ways of set-associative cache; and 2) means for allocating a plurality of micro-ops of the first entry to a micro-op data array of the micro-op cache, wherein allocating the plurality of micro-ops is according to an index comprising bank number of a plurality of cache banks and a set within one cache bank of the plurality of cache banks of the micro-op data array.

Example 22, the apparatus of Example 21, wherein the means allocating the plurality of micro-ops to the micro-op data array comprises means for sequentially allocating each micro-op of the plurality of micro-ops across the plurality of cache banks according to a sequential bank number, wherein the sequential bank number after a last cache bank of the plurality of cache banks comprises a first bank number of a first cache bank of the plurality of cache banks.

In Example 23, the apparatus of Example 22, further comprising: 1) means for storing, in a register, identification of a final cache bank of the plurality of cache banks of the micro-op data array to which a final micro-op of the first entry was allocated; and 2) means allocating, to a next cache bank that sequentially follows the final cache bank of the plurality of cache banks, a first micro-op of a second entry to the micro-op data array, wherein allocating the second entry sequentially follows allocating the first entry.

In Example 24, the apparatus of Example 21, wherein the means for allocating the plurality of micro-ops to the micro-op data array comprises beginning allocation to a cache bank of the plurality of cache banks other than a first cache bank of the plurality of cache banks.

In Example 25, the apparatus of Example 21, wherein the means for allocating the indexing metadata to the micro-op tag array comprises storing an index pointer for each of a plurality of micro-ops, the index pointer to point to a bank number and set within a cache bank of the plurality of cache banks of the micro-op data array.

In Example 26, the apparatus of Example 25, further comprising: 1) means for partitioning each cache bank of the plurality of cache banks into a plurality of regions, each region spanning multiple consecutively-numbered sets; and 2) means for configuring each index pointer to point to a set within an identified region of the plurality of regions.

Various implementations may have different combinations of the structural features described above. For instance, all optional features of the processors and methods described above may also be implemented with respect to a system described herein and specifics in the examples may be used anywhere in one or more implementations.

Example 27 is a non-transitory computer-readable medium storing instructions, which when executed by a processor having a cache controller coupled to micro-op cache, cause the processor to execute a plurality of logic operations comprising: 1) allocating indexing metadata of a first entry to a micro-op tag array of a micro-op cache according to a plurality of sets of ways of set-associative cache; and 2) allocating a plurality of micro-ops of the first entry to a micro-op data array of the micro-op cache, wherein allocating the plurality of micro-ops is according to an index comprising bank number of a plurality of cache banks and a set within one cache bank of the plurality of cache banks of the micro-op data array.

In Example 28, the non-transitory computer-readable medium of Example 27, wherein allocating the plurality of micro-ops to the micro-op data array comprises sequentially allocating each micro-op of the plurality of micro-ops across the plurality of cache banks according to a sequential bank number, wherein the sequential bank number after a last cache bank of the plurality of cache banks comprises a first bank number of a first cache bank of the plurality of cache banks.

In Example 29, the non-transitory computer-readable medium of Example 28, wherein the plurality of logic operations further comprises: 1) storing, in a register, identification of a final cache bank of the plurality of cache banks of the micro-op data array to which a final micro-op of the first entry was allocated; and 2) allocating, to a next cache bank that sequentially follows the final cache bank of the plurality of cache banks, a first micro-op of a second entry to the micro-op data array, wherein allocating the second entry sequentially follows allocating the first entry.

In Example 30, the non-transitory computer-readable medium of Example 27, wherein allocating the plurality of micro-ops to the micro-op data array comprises beginning allocation to a cache bank of the plurality of cache banks other than a first cache bank of the plurality of cache banks.

In Example 31, the non-transitory computer-readable medium of Example 27, wherein allocating the indexing metadata to the micro-op tag array comprises storing an index pointer for each of a plurality of micro-ops, the index pointer to point to a bank number and set within a cache bank of the plurality of cache banks of the micro-op data array.

In Example 32, the non-transitory computer-readable medium of Example 31, wherein the plurality of logic operations further comprises: 1) partitioning each cache bank of the plurality of cache banks into a plurality of regions, each region spanning multiple consecutively-numbered sets; and 2) configuring each index pointer to point to a set within an identified region of the plurality of regions.

Various implementations may have different combinations of the structural features described above. For instance, all optional features of the computer-readable medium and methods described above may also be implemented with respect to a system described herein and specifics in the examples may be used anywhere in one or more implementations.

Example 33 is a system comprising: 1) a micro-op cache comprising a micro-op tag array and a micro-op data array; and 2) a cache controller coupled to the micro-op cache, wherein to allocate a first entry to the micro-op cache, the cache controller is to: a) allocate indexing metadata of the first entry to the micro-op tag array according to a plurality of sets of ways of set-associative cache; and b) allocate a plurality of micro-ops to the micro-op data array according to an index within the micro-op data array, the index comprising bank number of a plurality of cache banks and a set within one cache bank of the plurality of cache banks of the micro-op data array.

In Example 34, the system of Example 33, wherein to allocate the plurality of micro-ops to the micro-op data array, the cache controller is to sequentially allocate each micro-op of the plurality of micro-ops across the plurality of cache banks according to a sequential bank number, and wherein the sequential bank number after a last cache bank of the plurality of cache banks comprises a first bank number of a first cache bank of the plurality of cache banks.

In Example 35, the system of Example 34, wherein, upon further allocation to the micro-op cache after a period of micro-op cache hits, the cache controller is further to: a) store, in a register, identification of a final cache bank of the plurality of cache banks associated with a final micro-op of a most-recent-hit entry in the micro-op data array; and b) allocate, to a next cache bank that sequentially follows the final cache bank of the plurality of cache banks, a first micro-op of a second entry to the micro-op data array, wherein allocation of the second entry sequentially follows the final cache bank identified in the register.

In Example 36, the system of Example 33, wherein, to allocate the plurality of micro-ops to the micro-op data array, the cache controller is to begin allocation to a cache bank of the plurality of cache banks other than a first cache bank of the plurality of cache banks.

In Example 37, the system of Example 33, wherein the micro-op tag array comprises a plurality of index pointers, each index pointer of the plurality of index pointers to point to a bank number and set within a cache bank of the plurality of cache banks of the micro-op data array.

In Example 38, the system of Example 37, wherein each cache bank of the plurality of cache banks of the micro-op data array is partitioned into to a plurality of regions, each region spanning multiple consecutively-numbered sets, and wherein each index pointer of the plurality of index pointers is to point to a set within an identified region of the plurality of regions.

In Example 39, the system of Example 33, wherein the micro-op data array is sized to be at least thirty percent smaller than the micro-op tag array.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a processor core circuitry; and
   a micro-op cache communicably coupled to the processor core circuitry, the micro-op cache comprising:
   a micro-op tag array, wherein tag array entries in the micro-op tag array are indexed according to set and way of set-associative cache; and
   a micro-op data array to store multiple micro-ops, wherein data array entries in the micro-op data array are indexed according to bank number of a plurality of physical cache banks and to a set within one physical cache bank of the plurality of physical cache banks, and wherein allocation to the micro-op data array is according to sequential bank numbers of the plurality of physical cache banks.

2. The processor of claim 1, wherein a next sequential bank number after a last cache bank of the plurality of physical cache banks comprises a first bank number associated with a first cache bank of the plurality of physical cache banks.

3. The processor of claim 2, further comprising a cache controller coupled to the micro-op cache, the cache controller to:
   store, in a register of the processor, identification of a final cache bank of the plurality of physical cache banks to which a final micro-op of a first entry was allocated in the micro-op data array; and
   allocate, to a next cache bank that sequentially follows the final cache bank of the plurality of physical cache banks, a first micro-op of a second entry to the micro-op data array, wherein allocation of the second entry sequentially follows allocation of the first entry.

4. The processor of claim 2, wherein allocation to the micro-op data array is to begin allocation to a physical cache bank of the plurality of physical cache banks other than a first physical cache bank of the plurality of physical cache banks in at least some cache entry allocations.

5. The processor of claim 1, wherein the micro-op tag array comprises a plurality of index pointers, each index pointer of the plurality of index pointers to point to a bank number and set within a physical cache bank of the plurality of physical cache banks of the micro-op data array.

6. The processor of claim 5, wherein each physical cache bank of the plurality of physical cache banks of the micro-op data array is partitioned into a plurality of regions, each region spanning multiple consecutively-numbered sets, and wherein each index pointer of the plurality of index pointers is to point to a set within an identified region of the plurality of regions.

7. The processor of claim 1, wherein the micro-op data array is sized to be at least thirty percent smaller than the micro-op tag array.

8. An integrated circuit comprising:
   a micro-op cache comprising a micro-op tag array and a micro-op data array; and
   a cache controller coupled to the micro-op cache, wherein to allocate a first entry to the micro-op cache, the cache controller is to:
   allocate indexing metadata of the first entry to the micro-op tag array according to a plurality of sets of ways of set-associative cache; and
   allocate a plurality of micro-ops to the micro-op data array according to an index within the micro-op data array, the index comprising bank number of a plurality of physical cache banks and a set within one physical cache bank of the plurality of physical cache banks of the micro-op data array, wherein allocation to the micro-op data array is according to sequential bank numbers of the plurality of physical cache banks.

9. The integrated circuit of claim 8, wherein a sequential bank number after a last cache bank of the plurality of physical cache banks comprises a first bank number of a first cache bank of the plurality of physical cache banks.

10. The integrated circuit of claim 9, wherein, upon further allocation to the micro-op cache after a period of micro-op cache hits, the cache controller is further to:
store, in a register, identification of a final cache bank of the plurality of physical cache banks associated with a final micro-op of a most-recent-hit entry in the micro-op data array; and
allocate, to a next cache bank that sequentially follows the final cache bank of the plurality of physical cache banks, a first micro-op of a second entry to the micro-op data array, wherein allocation of the second entry sequentially follows the final cache bank identified in the register.

11. The integrated circuit of claim 8, wherein, to allocate the plurality of micro-ops to the micro-op data array, the cache controller is to begin allocation to a physical cache bank of the plurality of physical cache banks other than a first physical cache bank of the plurality of physical cache banks.

12. The integrated circuit of claim 8, wherein the micro-op tag array comprises a plurality of index pointers, each index pointer of the plurality of index pointers to point to a bank number and set within a cache bank of the plurality of physical cache banks of the micro-op data array.

13. The integrated circuit of claim 12, wherein each physical cache bank of the plurality of physical cache banks of the micro-op data array is partitioned into a plurality of regions, each region spanning multiple consecutively-numbered sets, and wherein each index pointer of the plurality of index pointers is to point to a set within an identified region of the plurality of regions.

14. The integrated circuit of claim 8, wherein the micro-op data array is sized to be at least thirty percent smaller than the micro-op tag array.

15. A method comprising:
allocating, by a cache controller of a processor, indexing metadata of a first entry to a micro-op tag array of a micro-op cache according to a plurality of sets of ways of set-associative cache; and
allocating, by the cache controller, a plurality of micro-ops of the first entry to a micro-op data array of the micro-op cache, wherein allocating the plurality of micro-ops is according to an index comprising bank number of a plurality of physical cache banks and a set within one physical cache bank of the plurality of physical cache banks of the micro-op data array, and
wherein allocating the plurality of micro-ops to the micro-op data array comprises sequentially allocating each micro-op of the plurality of micro-ops across the plurality of physical cache banks according to a sequential bank number.

16. The method of claim 15, wherein the sequential bank number after a last cache bank of the plurality of physical cache banks comprises a first bank number of a first physical cache bank of the plurality of physical cache banks.

17. The method of claim 16, further comprising:
storing, in a register, identification of a final cache bank of the plurality of physical cache banks of the micro-op data array to which a final micro-op of the first entry was allocated; and
allocating, to a next cache bank that sequentially follows the final cache bank of the plurality of physical cache banks, a first micro-op of a second entry to the micro-op data array, wherein allocating the second entry sequentially follows allocating the first entry.

18. The method of claim 15, wherein allocating the plurality of micro-ops to the micro-op data array comprises beginning allocation to a physical cache bank of the plurality of physical cache banks other than a first physical cache bank of the plurality of physical cache banks.

19. The method of claim 15, wherein allocating the indexing metadata to the micro-op tag array comprises storing an index pointer for each of a plurality of micro-ops, the index pointer to point to a bank number and set within a physical cache bank of the plurality of physical cache banks of the micro-op data array.

20. The method of claim 19, further comprising:
partitioning each physical cache bank of the plurality of physical cache banks into a plurality of regions, each region spanning multiple consecutively-numbered sets; and
configuring each index pointer to point to a set within an identified region of the plurality of regions.

* * * * *